US012720399B2

(12) United States Patent
Liu et al.

(10) Patent No.: US 12,720,399 B2
(45) Date of Patent: Aug. 25, 2026

(54) METHOD FOR TRANSMITTING RADIO LINK FAILURE REPORT, AND TERMINAL DEVICE AND NETWORK DEVICE

(71) Applicant: GUANGDONG OPPO MOBILE TELECOMMUNICATIONS CORP., LTD., Dongguan (CN)

(72) Inventors: Yang Liu, Dongguan (CN); Xue Lin, Dongguan (CN); Cong Shi, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 672 days.

(21) Appl. No.: 18/091,987

(22) Filed: Dec. 30, 2022

(65) Prior Publication Data

US 2023/0262571 A1 Aug. 17, 2023

Related U.S. Application Data

(63) Continuation of application No. PCT/CN2020/117535, filed on Sep. 24, 2020.

(51) Int. Cl.

*H04W 36/36* (2009.01)
*H04W 36/00* (2009.01)
*H04W 36/30* (2009.01)

(52) U.S. Cl.

CPC ..... *H04W 36/362* (2023.05); *H04W 36/0058* (2018.08); *H04W 36/305* (2018.08)

(58) Field of Classification Search

None

See application file for complete search history.

(56) References Cited

U.S. PATENT DOCUMENTS

2020/0029251 A1* 1/2020 Wu .................. H04W 36/0016
2020/0077314 A1* 3/2020 Hwang ................ H04W 76/27

(Continued)

FOREIGN PATENT DOCUMENTS

CN 102065498 A 5/2011
CN 102547764 A 7/2012

(Continued)

OTHER PUBLICATIONS

Notice of priority examination of patent application issued in corresponding Chinese Application No. 202311339095.5, dated Sep. 19, 2024, 8 pages.

(Continued)

*Primary Examiner* — Hassan A Phillips
*Assistant Examiner* — Gautam Sharma
(74) *Attorney, Agent, or Firm* — BAYES PLLC

(57) ABSTRACT

A method for sending radio link failure (RLF) report includes: sending a CHO-related RLF report including at least one of: a result of signal measurement performed on a neighbor cell; a result of signal measurement performed on a candidate cell not meeting a handover execution/triggering condition; a list of candidate cells meeting the handover execution/triggering condition; a list of candidate cells not meeting the handover execution/triggering condition; an identifier of a first cell, where the first cell includes a cell where an RRC reconfiguration signaling is received; indication information of a handover execution condition type; a parameter corresponding to a configured handover execution condition; information used for indicating whether RLF occurs in the first cell until the CHO is performed; a length of time from receiving a CHO configuration to triggering the CHO; a handover type identifier.

13 Claims, 5 Drawing Sheets

(56) References Cited

U.S. PATENT DOCUMENTS

| | | | | |
|---|---|---|---|---|
| 2020/0336957 | A1* | 10/2020 | Wu | H04W 36/00837 |
| 2020/0351731 | A1* | 11/2020 | Kim | H04W 36/0079 |
| 2021/0029600 | A1* | 1/2021 | Balan | H04W 36/0094 |
| 2021/0058834 | A1* | 2/2021 | Paladugu | H04W 24/08 |
| 2021/0274404 | A1* | 9/2021 | Koziol | H04W 36/0094 |
| 2022/0124590 | A1* | 4/2022 | Da Silva | H04W 36/302 |
| 2022/0141735 | A1* | 5/2022 | Liu | H04W 36/305<br>370/331 |
| 2022/0159530 | A1* | 5/2022 | Kim | H04W 36/362 |
| 2022/0201582 | A1* | 6/2022 | Eklöf | H04W 24/08 |
| 2022/0217597 | A1* | 7/2022 | Ishii | H04W 76/20 |
| 2023/0070083 | A1* | 3/2023 | Stanczak | H04W 36/0094 |
| 2024/0098588 | A1* | 3/2024 | Da Silva | H04W 36/362 |
| 2024/0214839 | A1* | 6/2024 | Xu | H04W 24/04 |

FOREIGN PATENT DOCUMENTS

| | | | |
|---|---|---|---|
| CN | 102932821 | A | 2/2013 |
| CN | 103379517 | A | 10/2013 |
| CN | 103581961 | A | 2/2014 |
| CN | 107113673 | A | 8/2017 |
| CN | 110475386 | A | 11/2019 |
| CN | 110831081 | A | 2/2020 |
| EP | 3611963 | A1 | 2/2020 |
| WO | 2019/175463 | A1 | 9/2019 |
| WO | 2020088777 | A1 | 5/2020 |
| WO | 2020156497 | A1 | 8/2020 |
| WO | 2020163991 | A1 | 8/2020 |

OTHER PUBLICATIONS

First Office Opinion Notice issued in corresponding Chinese Application No. 202311339095.5, dated Oct. 9, 2024, 20 pages.

International Search Report issued in International application No. PCT/CN2020/117535, mailed Jun. 23, 2021, 4 pages.

Written Opinion of the International Searching Authority issued in International application No. PCT/CN2020/117535, mailed Jun. 23, 2021, 7 pages.

3GPP TSG, RAN WG2 #1 1 1 e R2 200 7662, Electronic meeting , Aug. 17-Aug. 28, 2020, "Summary of AI 8 . 1 3 2 SON, RAN2 scope and requirements", Agenda Item: 8.13.2, Source: Ericsson, 20 pages.

3GPP TSG-RAN WG2 #111e Tdoc R2-2007661, Electronic meeting, Aug. 17-28, 2020, "SON Scope and Requirements for Rel.17", Agenda Item: 8.13.2, Source: Ericsson, 10 pages.

3GPP TSG-RAN WG3 #109-e, R3-205125, Aug. 17-27, 2020 E-Meeting, "Discussion on MRO for CHO mobility enhance", Source: CATT, Agenda Item: 10.2.6, 3 pages.

CMCC, "SON Consideration for R16 Mobility Enhancement", R2-2007435, 3GPP TSG-RAN WG2 Meeting #111 electronic Online, Aug. 17-28, 2020.

Nokia et al., "On RLF reporting for CHO and DAPS", R2-1915497, 3GPP TSG-RAN WG2 Meeting #108 Reno, USA, of Nov. 18-22, 2019.

OPPO, "Enhancements and scope of R17 SON", R2-2007155, 3GPP TSG-RAN WG2 Meeting #111 electronic Online, Aug. 17-28, 2020.

3GPP TS 38.331 V16.1.0 (Jul. 2020); Technical Specification Group Radio Access Network; NR; Radio Resource Control (RRC) protocol specification (Release 16).

Second Office Action issued in corresponding Chinese Application No. 202311339095.5, mailed Jan. 10, 2025, 14 pages.

Extended European Search Report issued in corresponding European Application No. 20954523.5, dated Sep. 28, 2023, 14 pages.

Third Office Action issued in corresponding Chinese Application No. 202311339095.5, mailed on May 8, 2025, 15 pages.

* cited by examiner

100

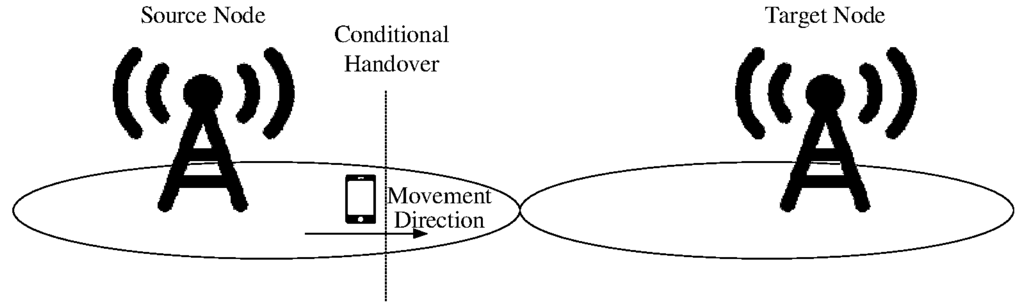

Transmit a CHO-related RLF report, wherein the CHO-related RLF report comprises at least one of the following:
a result of signal measurement performed on a neighbor cell by a terminal device;
a result of signal measurement performed on candidate cells, that do not satisfy a handover execution/trigger condition, by the terminal device;
a list of candidate cells that satisfy the handover execution/trigger condition;
a list of candidate cells that do not satisfy the handover execution/trigger condition;
the identifier of a first cell, the first cell comprising a cell for which the terminal device receives RRC reconfiguration signaling;
indication information for a handover execution condition type configured for a terminal;
parameters corresponding to the configured handover execution condition;
information for indicating whether an RLF occurs in the terminal device in the first cell up until the CHO is performed;
the length of time from the receiving of a CHO configuration to the triggering of the CHO; and
a handover type identifier

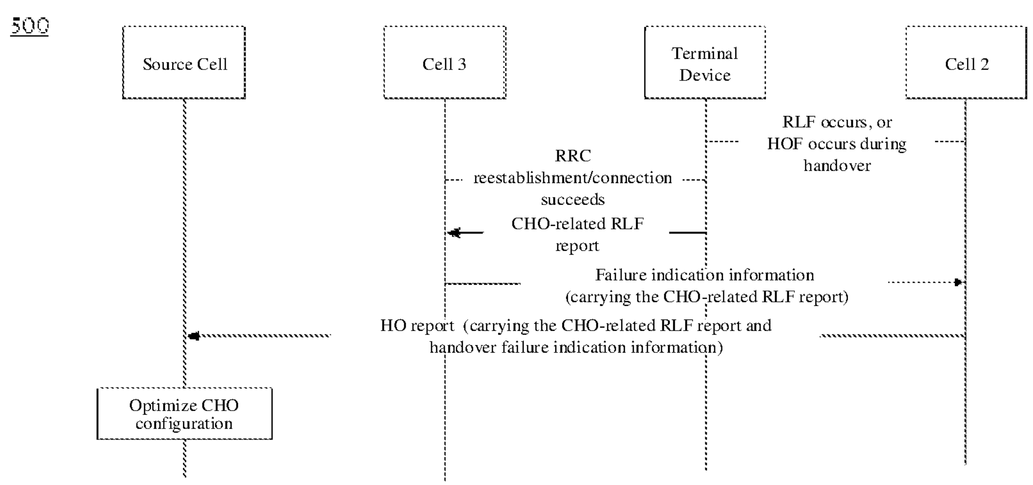

Receive a CHO-related RLF report from a terminal device, wherein the CHO-related RLF report includes at least one of the following:
a result of signal measurement performed on a neighbor cell by a terminal device;
a result of signal measurement performed on candidate cells, that do not satisfy a handover execution/trigger condition, by the terminal device;
a list of candidate cells that satisfy the handover execution/trigger condition;
a list of candidate cells that do not satisfy the handover execution/trigger condition;
the identifier of a first cell, the first cell including a cell for which the terminal device receives RRC reconfiguration signaling;
indication information for a handover execution condition type configured for a terminal;
parameters corresponding to the configured handover execution condition;
information for indicating whether an RLF occurs in the terminal device in the first cell up until the CHO is performed;
the length of time from the receiving of a CHO configuration to the triggering of the CHO; and
a handover type identifier

FIG. 6

METHOD FOR TRANSMITTING RADIO LINK FAILURE REPORT, AND TERMINAL DEVICE AND NETWORK DEVICE

CROSS-REFERENCE TO RELATED APPLICATION

This application is a continuation of PCT application No. PCT/CN2020/117535, filed Sep. 24, 2020, entitled "METHOD FOR TRANSMITTING RADIO LINK FAILURE REPORT, AND TERMINAL DEVICE AND NETWORK DEVICE," which is hereby incorporated by reference in its entirety.

TECHNICAL FIELD

This application relates to the field of communications, and more particularly, to a method for sending a radio link failure report, a terminal device and a network device.

BACKGROUND

Different from traditional handover, conditional handover (CHO) is a cell handover manner in which the terminal autonomously determines the handover time and handover target. In the conditional handover manner, after receiving an RRC reconfiguration message (RRCReconfiguration) including the handover configuration, the terminal evaluates whether the CHO execution condition is satisfied, rather than performing handover immediately. If the subsequent evaluation result is the condition is satisfied, the terminal accesses the target cell. At this time, the terminal does not need to query the source base station whether to allow the handover to be performed.

If the handover is performed by the terminal too early, for example, when the handover fails during the terminal's accessing to the target node, or when a radio link failure (RLF) occurs on the target node after the handover is successfully completed, the terminal will select the source cell through a cell selection procedure and initiate a reestablishment procedure. After completing the reestablishment, the terminal sends an RLF report to the source node. Upon determining that it is a handover problem referred to as "too early CHO", the source base station may change threshold setting of a measurement target corresponding to the measurement report event of the terminal. This process is called mobility robust optimization (MRO). In the current version of MRO, RLF-related content corresponding to the CHO sent by the terminal when the CHO fails is not considered, and optimization of the CHO configuration is not supported at the network side by using the RLF-related content.

SUMMARY

Some embodiments of this application provide a method for sending a radio link failure report, a terminal device and a network device, thereby enabling the terminal to send RLF-related content corresponding to CHO, which is helpful for the network to adjust configuration parameters.

Some embodiments of this application provide a method for sending a radio link failure report, which is applied to a terminal device and includes:

sending an RLF report related to a conditional handover (CHO), where the RLF report related to the CHO includes at least one of following:
- a result of signal measurement performed by the terminal device on a neighbor cell;
- a result of signal measurement performed by the terminal device on a candidate cell not meeting a handover execution/triggering condition;
- a list of candidate cells meeting the handover execution/triggering condition;
- a list of candidate cells not meeting the handover execution/triggering condition;
- an identifier of a first cell, where the first cell includes a cell where the terminal device receives a radio resource control (RRC) reconfiguration signaling;
- indication information of a handover execution condition type configured for the terminal device;
- a parameter corresponding to a configured handover execution condition; information used for indicating whether the terminal device has experienced RLF in the first cell until the CHO is performed;
- a length of time from receiving a CHO configuration to triggering the CHO; a handover type identifier.

Some embodiments of this application further provide a method for receiving and using RLF report, which is applied to a network device and includes:

receiving from a terminal device an RLF report related to a CHO, where the RLF report related to the CHO includes at least one of following:
- a result of signal measurement performed by the terminal device on a neighbor cell;
- a result of signal measurement performed by the terminal device on a candidate cell not meeting a handover execution/triggering condition;
- a list of candidate cells meeting the handover execution/triggering condition;
- a list of candidate cells not meeting the handover execution/triggering condition;
- an identifier of a first cell, where the first cell includes a cell where the terminal device receives a radio resource control (RRC) reconfiguration signaling;
- indication information of a handover execution condition type configured for the terminal device;
- a parameter corresponding to a configured handover execution condition; information used for indicating whether the terminal device has experienced RLF in the first cell until the CHO is performed;
- a length of time from receiving a CHO configuration to triggering the CHO; a handover type identifier.

Some embodiments of this application further provide a terminal device, including:

a sending module, configured to send an RLF report related to a CHO, where the RLF report related to the CHO includes at least one of following:
- a result of signal measurement performed by the terminal device on a neighbor cell;
- a result of signal measurement performed by the terminal device on a candidate cell not meeting a handover execution/triggering condition;
- a list of candidate cells meeting the handover execution/triggering condition;
- a list of candidate cells not meeting the handover execution/triggering condition;
- an identifier of a first cell, where the first cell includes a cell where the terminal device receives a radio resource control (RRC) reconfiguration signaling;
- indication information of a handover execution condition type configured for the terminal device;
- a parameter corresponding to a configured handover execution condition; information used for indicating whether the terminal device has experienced RLF in the first cell until the CHO is performed;

a length of time from receiving a CHO configuration to triggering the CHO; a handover type identifier.

Some embodiments of this application further provide a network device, including:

a receiving module, configured to receive from a terminal device an RLF report related to a CHO, where the RLF report related to the CHO includes at least one of following:

a result of signal measurement performed by the terminal device on a neighbor cell;

a result of signal measurement performed by the terminal device on a candidate cell not meeting a handover execution/triggering condition;

a list of candidate cells meeting the handover execution/triggering condition;

a list of candidate cells not meeting the handover execution/triggering condition;

an identifier of a first cell, where the first cell includes a cell where the terminal device receives a radio resource control (RRC) reconfiguration signaling;

indication information of a handover execution condition type configured for the terminal device;

a parameter corresponding to a configured handover execution condition; information used for indicating whether the terminal device has experienced RLF in the first cell until the CHO is performed;

a length of time from receiving a CHO configuration to triggering the CHO;

a handover type identifier.

Some embodiments of this application further provide a terminal device, including: a processor and a memory, where the memory is configured to store a computer program, the processor is configured to call and run the computer program stored in the memory, thereby implementing the method for sending RLF report according to any embodiment as described above.

Some embodiments of this application further provide a network device, including: a processor and a memory, where the memory is configured to store a computer program, the processor is configured to call and run the computer program stored in the memory, thereby implementing the method for receiving and using RLF report according to any embodiment as described above.

Some embodiments of this application further provide a chip, including: a processor for calling and running a computer program from a memory, enabling a device installed with the chip to implement the method for sending RLF report according to any embodiment as described above.

Some embodiments of this application further provide a chip, including: a processor for invoking and running a computer program from a memory, enabling a device installed with the chip to implement the method for receiving and using RLF report according to any embodiment as described above.

Some embodiments of this application further provide a computer-readable storage medium for storing a computer program, where the computer program enables a computer to implement the method for sending RLF report according to any embodiment as described above.

Some embodiments of this application further provide a computer-readable storage medium for storing a computer program, where the computer program enables a computer to implement the method for receiving and using RLF report according to any embodiment as described above.

Some embodiments of this application further provide a computer program product, including computer program instructions, where the computer program instructions cause a computer to implement the method for sending RLF report according to any embodiment as described above.

Some embodiments of this application further provide a computer program product, including computer program instructions, where the computer program instructions cause a computer to implement the method for receiving and using RLF report according to any embodiment as described above.

Some embodiments of this application further provide a computer program, where the computer program enables a computer to implement the method for sending RLF report according to any embodiment as described above.

Some embodiments of this application further provide a computer program, where the computer program enables a computer to implement the method for receiving and using RLF report according to any embodiment as described above.

By sending the RLF report related to the CHO in some embodiments of this application, the terminal can send the RLF-related content corresponding to the CHO, and the content can be used by the network to optimize the configuration.

BRIEF DESCRIPTION OF THE DRAWINGS

FIG. 1 is a schematic diagram of an application scenario according to some embodiments of this application.

FIG. 2 is an implementation flowchart of a method 200 for sending a radio link failure report according to some embodiments of this application.

FIG. 5 is an implementation flow chart of a manner 500 in which the terminal sends a CHO-related RLF report and the network side optimizes the configuration according to some embodiments of this application.

FIG. 6 is an implementation flowchart of a method 600 for receiving and using an RLF report according to some embodiments of this application.

DETAILED DESCRIPTION

Figure 3:
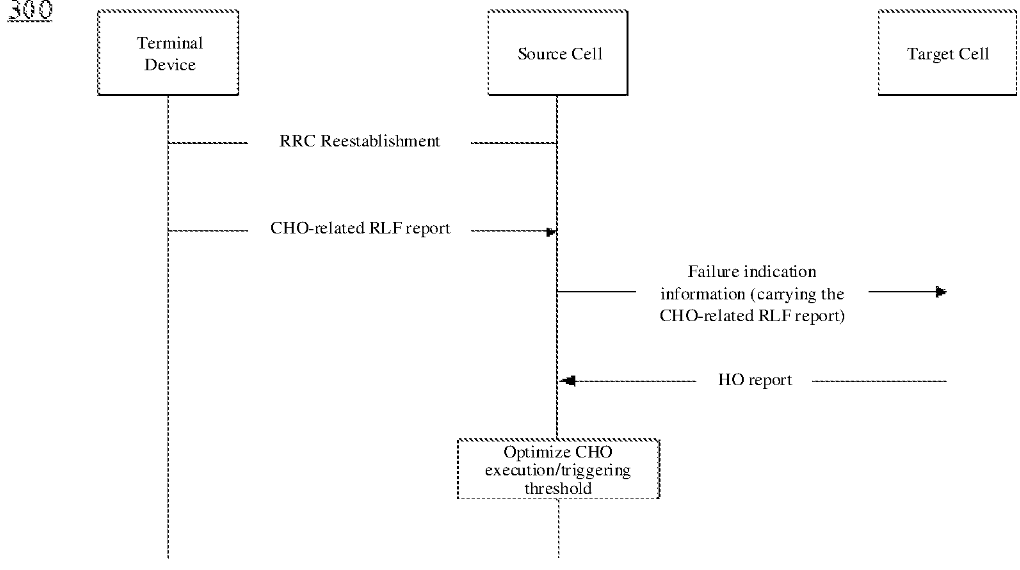
FIG. 3 is an implementation flowchart of a method 300 in which the terminal sends a CHO-related RLF report and the network side optimizes the configuration according to some embodiments of this application.

The technical solutions according to some embodiments of this application will be described below with reference to the accompanying drawings in the embodiments of this application.

It should be noted that the terms "first" and "second" in the description and claims as well as the above drawings according to the embodiments of this application are used to distinguish similar objects, and are not necessarily used to describe a specific order or sequence. The objects described by "first" and "second" at the same time may be the same or different.

The technical solutions according to some embodiments of this application may be applied to various communication systems, for example, GSM (Global System of Mobile communication) system, CDMA (Code Division Multiple Access) system, WCDMA (Wideband Code Division Multiple Access) system, GPRS (General Packet Radio Service), LTE (Long Term Evolution) system, LTE-A (Advanced long term evolution) system, NR (New Radio) system, evolution system of the NR system, LTE-U (LTE-based access to unlicensed spectrum) system, NR-U (NR-based access to unlicensed spectrum) system, UMTS (Universal Mobile Telecommunication System), WLAN (Wireless Local Area Networks), WiFi (Wireless Fidelity), 5G (5th-Generation) system or other communication systems.

Generally speaking, traditional communication systems support a limited number of connections and are easy to implement. However, with the development of communication technology, mobile communication systems will not only support traditional communication, but also support, for example, D2D (Device to Device) communication, M2M (Machine to Machine) communication, MTC (Machine Type Communication), V2V (Vehicle to Vehicle) communication, and the like. Embodiments of this application can also be applied to these communications systems.

Optionally, the communication system in some embodiments of this application may be applied to a CA (Carrier Aggregation) scenario, a DC (Dual Connectivity) scenario, or a SA (Standalone) networking scenario.

Embodiments of this application do not limit the applied spectrum. For example, some embodiments of this application may be applied to licensed spectrum, and may also be applied to unlicensed spectrum.

Various embodiments of this application are described in conjunction with network device and terminal device, where the terminal device may also be referred to as user equipment (UE), access terminal, subscriber unit, subscriber station, mobile station, mobile site, remote station, remote terminal, mobile device, user terminal, terminal, wireless communication device, user agent, user device, or the like. The terminal device may be a station (ST) in the WLAN, or may be a cellular phone, a cordless phone, a session initiation protocol (SIP) phone, a wireless local loop (WLL) station, a personal digital processing (PDA) device, a handheld device with wireless communication capabilities, a computing device or other processing devices connected to wireless modems, or may be an in-vehicle device, a wearable device, and a terminal device in next-generation communication systems, such as the NR network, future-evolved public land mobile network (PLMN), or the like.

As an example without limitation, in some embodiments of this application, the terminal device may also be a wearable device. Wearable devices may also be called wearable smart devices, which are the general term for the intelligent design of daily wear and the development of wearable devices using wearable technology, such as glasses, gloves, watches, clothing and shoes. Wearable device is a portable device that is worn directly on the body or integrated into the user's clothing or accessories. Wearable device is not only a hardware device, but also realizes powerful functions through software support, data interaction, and cloud interaction. In a general sense, wearable smart devices may be of full-feature, large-scale, with complete or partial functions without relying on smart phones, including such as smart watches or smart glasses; or may only focus on a certain type of application function, which needs to cooperate with other devices such as smart phones, including such as various smart bracelets, and smart jewelry for physical sign monitoring.

The network device may be a device for communicating with a mobile device. For example, the network device may be an access point (AP) in WLAN, or a base transceiver station (BTS) in GSM or CDMA, a NodeB (NB) in WCDMA, an evolutional Node B (eNB or eNodeB) in LTE, a relay station, an access point, an in-vehicle device, a wearable device, a network device (gNB) in NR network, a network device in the future-evolved PLMN network, or the like.

In some embodiments of this application, the network device provides services for a cell, and the terminal device communicates with the network device through transmission resources (e.g., frequency domain resources, or spectrum resources) used by the cell, and the cell may be a cell corresponding to the network device (e.g., base station). The cell may belong to a macro base station, or may belong to a base station corresponding to a small cell, where the small cell may include a metro cell, a micro cell, a pico cell, a femto cell, and the like. These small cells have the characteristics of small coverage and low transmit power, and are suitable for providing high-speed data transmission services.

FIG. 1 exemplarily shows a terminal device and a source node (e.g., a Source NG-RAN node) and a target node (e.g., a Target NG-RAN node). The source node may be a source base station, and the target node may be a target base station. The terminal device performs a conditional handover from the source base station to the target base station.

Optionally, the wireless communication system 100 may further include other network entities such as a mobility management entity (MME), an access and mobility management function (AMF), which is not limited in embodiments of this application.

It should be understood that the terms "system" and "network" are often used interchangeably herein. The term "and/or" in this disclosure is only used for describing an association relationship between associated objects, indicating that there may be three kinds of relationships. For example, A and/or B may include such three situations that A exists alone, both A and B exist, and B exist alone. In addition, the character "I" in this disclosure generally indicates that the related objects are in an "or" relationship.

Some embodiments of this application propose a method for sending a radio link failure report. FIG. 2 is an implementation flowchart of a method 200 for sending a radio link failure report according to some embodiments of this application, and the method may optionally be applied to the system shown in FIG. 1, for example, applied to the terminal device in the system shown in FIG. 1, but it is not limited thereto. The method includes at least some of the following content.

In S210, a CHO-related RLF report is sent, where the CHO-related RLF report includes at least one of the following:

- a result of signal measurement performed by the terminal device on a neighbor cell;
- a result of signal measurement performed by the terminal device on a candidate cell not meeting a handover execution/triggering condition;
- a list of candidate cells meeting the handover execution/triggering condition;

a list of candidate cells not meeting the handover execution/triggering condition;

an identifier of a first cell, where the first cell includes a cell where the terminal device receives a radio resource control (RRC) reconfiguration signaling;

indication information of a handover execution condition type configured for the terminal device;

a parameter corresponding to a configured handover execution condition;

information used for indicating whether the terminal device has experienced RLF in the first cell until the CHO is performed;

a length of time from receiving a CHO configuration to triggering the CHO;

a handover type identifier.

In some embodiments, the first cell includes a source cell.

Optionally, the neighbor cell includes a candidate cell(s) and/or a non-candidate cell(s).

Optionally, the handover type identifier is used for indicating whether the handover type is CHO or traditional handover. The traditional handover may refer to a handover mode other than CHO.

In some embodiments of this application, the candidate cell may be determined in the following manner.

Upon receiving the measurement report of the terminal, the source base station determines a possible CHO target cell range according to the measurement report of the terminal. After that, the source base station negotiates with base stations where these cells are located, and queries them for the possibility of accepting the CHO. If the other party accepts the handover of the terminal, it may send a handover request confirmation message to the source base station, where the message may also carry information such as access resources and bearer configuration for the terminal to access a target cell under the base station. The cell(s), within the target cell range, that confirms to accept the terminal handover is the candidate cell(s).

Optionally, the result of signal measurement performed by the terminal device on the neighbor cell includes at least one of the following:

the result of signal measurement performed by the terminal device on the neighbor cell until the CHO is performed;

the result of signal measurement performed by the terminal device on the neighbor cell until a traditional handover is performed;

the result of signal measurement performed by the terminal device on the neighbor cell until an RLF is detected;

the result of signal measurement performed by the terminal device on the neighbor cell until a handover failure (HOF) is detected;

the result of signal measurement performed by the terminal device on the neighbor cell until a result of signal measurement on at least one candidate cell meets the handover execution/triggering condition.

Optionally, the result of signal measurement performed by the terminal device on the candidate cell not meeting the handover execution/triggering condition includes at least one of the following:

the result of signal measurement performed by the terminal device on the candidate cell not meeting the handover execution/triggering condition until the CHO is performed;

the result of signal measurement performed by the terminal device on the candidate cell not meeting the handover execution/triggering condition until the traditional handover is performed;

the result of signal measurement performed by the terminal device on the candidate cell not meeting the handover execution/triggering condition until the RLF is detected;

the result of signal measurement performed by the terminal device on the candidate cell not meeting the handover execution/triggering condition until the HOF is detected;

the result of signal measurement performed by the terminal device on the candidate cell not meeting the handover execution/triggering condition until the result of signal measurement on the at least one candidate cell meets the handover execution/triggering condition.

Optionally, the result of signal measurement includes at least one of the following:

reference signal receiving power (RSRP);

reference signal receiving quality (RSRQ);

signal to interference plus noise ratio (SINR).

Optionally, the parameter corresponding to the configured handover execution condition includes at least one of a frequency-specific offset, a cell-specific offset, an additional offset, a hysteresis, and a threshold.

In some embodiments, the result of signal measurement performed by the terminal device on the neighbor cell may be expressed in at least the following three manners.

In the first manner, the result of signal measurement performed by the terminal device on the neighbor cell includes the measurement result of each neighbor cell, and the measurement result of each neighbor cell includes at least one of the following:

a result of signal measurement on the neighbor cell;

a cell ID of the neighbor cell;

indication information of whether the neighbor cell is a candidate cell.

For example, an identifier is added to measResultNR of the neighbor cell to identify whether the corresponding neighbor cell is a candidate cell. An example is as follows.

```
  MeasResultNR ::=              SEQUENCE {
  physCellId                    PhysCellId
OPTIONAL,
  isCandidateCell               boolean{true,false}
    measResult                    SEQUENCE {
      cellResults                   SEQUENCE{
        resultsSSB-Cell                 MeasQuantityResults
OPTIONAL,
        resultsCSI-RS-Cell              MeasQuantityResults
OPTIONAL
      },
      rsIndexResults                SEQUENCE{
        resultsSSB-Indexes              ResultsPerSSB-IndexList
OPTIONAL,
        resultsCSI-RS-Indexes           ResultsPerCSI-RS-IndexList
OPTIONAL
      }
OPTIONAL
    },
    ...,
    [[
    cgi-Info                      CGI-InfoNR
OPTIONAL
    ]]
  }
```

As can be seen from the above example, an optional identifier "isCandidateCell" is added to measResultNR, and possible values of the identifier are true and false, which are respectively used for indicating that the cell is a candidate cell or not a candidate cell.

In the second manner, the result of signal measurement performed by the terminal device on the neighbor cell includes a measurement result list of neighbor cells corresponding to frequencies of different synchronization signal blocks (SSB) or channel status indicator reference signal (CSI-RS), where the measurement result list of the neighbor cells includes the result of signal measurements on each neighbor cell.

Further, the list where the result of signal measurement on the neighbor cell is located or the result of signal measurement on each neighbor cell also includes information used for indicating whether each neighbor cell is a candidate cell.

For example, the measurement result list of neighbor cells is specifically measResultNRList, and a bitmap is added to measResultNRList to identify which cells in the list are candidate cells. Each bit in the bitmap corresponds to a cell, and is used for indicating whether the cell is a candidate cell. For example, a bitmap containing 6 bits can identify a cell list containing 6 neighbor cells. When the bitmap is 000111, it identifies the last 3 cells in the list are candidate cells.

In the third manner, the result of signal measurement performed by the terminal device on the neighbor cell includes a first neighbor cell measurement result list and a second neighbor cell measurement result list.

The first neighbor cell measurement result list may include the result of signal measurements on neighbor cells belonging to the candidate cell.

The second neighbor cell measurement result list may include the result of signal measurements on neighbor cells not belonging to the candidate cell.

For example, the original measResultNeighbourCell is split into two, for example, measResultCandidateCell and measResultNonCandidateCell, where measResultCandidateCell includes the result of signal measurements on neighbor cells belonging to the candidate cell, and measResultNonCandidateCelll includes the result of signal measurements on neighbor cells that do not belong to the candidate cell.

Optionally, when the information used for indicating whether the terminal device has experienced RLF in the first cell until the CHO is performed indicates that RLF has occurred, the CHO-related RLF report further includes: a result of signal measurement performed by the terminal device on a candidate cell and/or a result of signal measurement on a neighbor cell when the RLF is detected in the first cell.

Optionally, in response to successful RRC reestablishment/connection establishment, the terminal device sends the CHO-related RLF report to a cell where the RRC reestablishment/connection establishment is successful.

Optionally, the CHO-related RLF report further includes indication information of that the terminal device has received CHO configuration information.

Optionally, the terminal device sends the CHO-related RLF report via an air interface.

The information included in the CHO-related RLF report may be used for facilitating the network to optimize the configuration.

In the above-mentioned case that the RRC reestablishment/connection establishment is successful, the terminal device sends the CHO-related RLF report to the cell where the RRC reestablishment/connection establishment is successful, and the network side optimizes the configuration according to the CHO-related RLF report in at least the following three manners.

The first manner is shown in FIG. 3. FIG. 3 is an implementation flowchart of a method 300 in which the terminal sends a CHO-related RLF report and the network side optimizes the configuration according to some embodiments of this application.

As shown in FIG. 3, in the case of too early CHO, the terminal device performs RRC reestablishment on the source cell. After that, the terminal device directly reports the CHO-related RLF report to the base station where the source cell is located (i.e., the source base station) via the air interface.

After that, the base station where the source cell is located reports the CHO-related RLF report to the base station where the target cell of CHO execution is located (i.e., the target base station) through failure indication signaling. Optionally, the failure indication signaling carries a handover type information indication, which is used for indicating whether the handover is a CHO or a traditional handover.

The target cell of execution determines that the handover is too early through a detection mechanism, and replies this information to the base station where the source cell is located through the handover (HO) report on the Xn interface. Optionally, a handover type information indication is carried on the HO report, which is used for indicating whether the handover is the CHO or the traditional handover.

The source cell optimizes relevant parameters of the CHO execution/triggering condition according to the result of signal measurement performed by the terminal device on the candidate cell and/or the result of signal measurement on the neighbor cell when RLF occurs in the first cell (e.g., the source cell), which is carried in the CHO-related RLF report. For example, in the case of handover failure, optimization of the relevant parameters of the CHO execution/triggering condition includes at least one of the following:

- increasing a hysteresis and/or an offset corresponding to a CHO execution/triggering A3 event oriented to a target cell in the CHO configuration, which is to be configured for a terminal having a similar movement trajectory and/or a similar signal measurement result;
- increasing a signal threshold of the target cell corresponding to an A5 event;
- decreasing a signal threshold of the first cell corresponding to the A5 event.

The A3 event may refer to that a measurement value of a neighbor cell is better than the measurement value of the serving cell by a certain threshold.

The A5 event may refer to that the measurement value of the serving cell is less than a threshold 1, while a channel quality of a neighbor cell is greater than a threshold 2.

Figure 4:
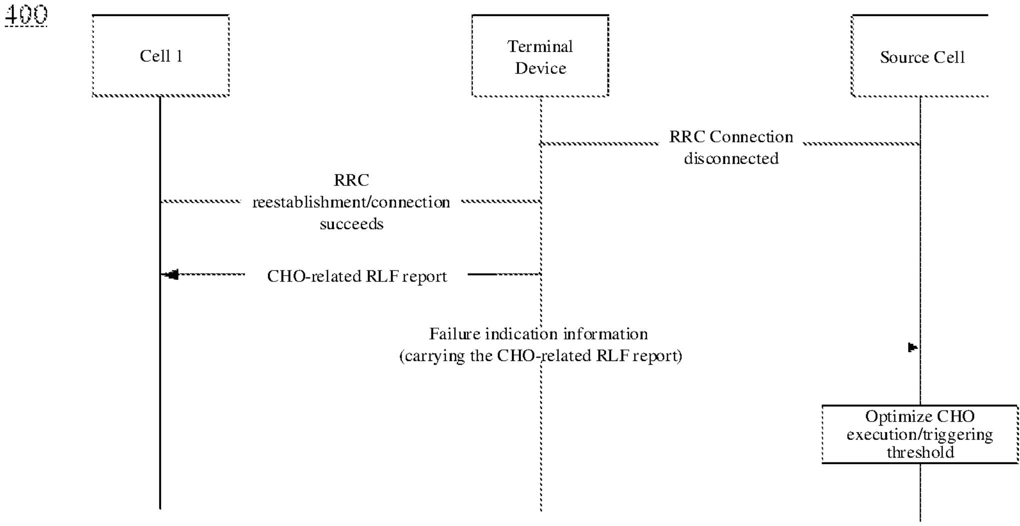
FIG. 4 is an implementation flowchart of a method 400 in which the terminal sends a CHO-related RLF report and the network side optimizes the configuration according to some embodiments of this application.

The second manner is shown in FIG. 4. FIG. 4 is an implementation flowchart of a method 400 in which the terminal sends a CHO-related RLF report and the network side optimizes the configuration according to some embodiments of this application.

As shown in FIG. 4, in the case of too late CHO, after the terminal is disconnected from the source cell, the terminal performs RRC reestablishment/connection to a certain cell and succeeds. Subsequently, the terminal sends the CHO-related RLF report to the cell (cell 1 as shown in FIG. 3) via the air interface.

Finally, the cell sends a failure indication signaling to the source cell via the Xn interface, where the failure indication signaling includes the CHO-related RLF report. Optionally, the CHO-related RLF report may include indication information that the terminal device has received the CHO configuration information.

The source cell optimizes the CHO triggering threshold by acknowledging the measurement results of the terminal on neighbor cells and candidate cells when RLF occurs. For example, the source cell optimizes relevant parameters of the CHO execution/triggering condition according to the result of signal measurement performed by the terminal device the candidate cell and/or the result of signal measurement performed on the neighbor cell, which is(are) carried in the CHO-related RLF report, when RLF occurs in the first cell (e.g., the source cell). For example, optimization of the relevant parameters of the CHO execution/triggering condition includes at least one of the following:

- increasing a hysteresis and/or an offset corresponding to the CHO execution/triggering A3 event oriented to the target cell in the CHO configuration, which is to be configured for a terminal having a similar movement trajectory and/or a similar signal measurement result;
- increasing the signal threshold of the target cell corresponding to the A5 event;
- decreasing the signal threshold of the first cell corresponding to the A5 event.

The A3 event and the A5 event have been introduced in the above-mentioned embodiments, and are not repeated here.

The third manner is shown in FIG. 5. FIG. 5 is an implementation flow chart of a manner 500 in which the terminal sends a CHO-related RLF report and the network side optimizes the configuration according to some embodiments of this application.

As shown in FIG. 5, in the case of handover (HO) to wrong cell, RLF occurs soon after the terminal switches to the wrong cell (cell 2 in FIG. 5) or HOF occurs during the handover procedure, the terminal then performs RRC reestablishment/connection towards another cell (cell 3 in FIG. 5) and succeeds.

The terminal then sends a CHO-related RLF report to cell 3. Cell 3 sends the CHO-related RLF report to cell 2 through failure indication signaling.

Cell 2 determines that it is a case of HO to wrong cell and, accordingly, sends the HO report including the CHO-related RLF report and handover failure indication information to the source cell.

The source cell optimizes the CHO configuration according to the CHO-related RLF report. Optionally, in the case of handover failure, the optimization manner includes at least one of the following:

- adding the cell experiencing successful RRC reestablishment/connection establishment (cell 3 in FIG. 5) into the candidate cell selection range;
- increasing a hysteresis and/or an offset corresponding to the CHO execution/triggering A3 event oriented to the cell experiencing successful RRC reestablishment/connection establishment in the CHO configuration, which is to be configured for a terminal having a similar movement trajectory and/or a similar signal measurement result;
- increasing the signal threshold of the target cell corresponding to the A5 event;
- decreasing the signal threshold of the first cell corresponding to the A5 event.

The A3 event and the A5 event have been introduced in the above-mentioned embodiments, and are not repeated here.

Optionally, the above-mentioned optimization manner of adding the cell experiencing successful RRC reestablishment/connection establishment (cell 3 in FIG. 5) into the candidate cell selection range may be applicable to a case where the previous candidate cell selection range does not include this cell.

Optionally, whether to add the cell experiencing successful RRC reestablishment/connection establishment to the candidate cell selection range may be determined according to the time until connection (timeUntilReconnction), that is, according to the time from connection failure to successful connection reestablishment.

Optionally, the source base station may adjust the handover threshold according to the result of signal measurement performed by the terminal device on the candidate cell and/or the result of signal measurement on the neighbor cell when RLF occurs in the first cell, which is included in the CHO-related RLF report. For example, in the scenario of handover to wrong cell, in addition to adding the cell, with which the reestablishment is finally successful, as the target candidate cell/down-scaling the CHO execution/triggering threshold of the cell with the successful reestablishment, if RLF occurs in the source cell when the handover is not performed by the terminal, the handover execution threshold may be adjusted accordingly based on the result of signal measurement on this cell when the RLF occurs.

In addition to the optimization manners introduced in the above-mentioned embodiments, which are applicable to the forgoing three cases, the source base station may also adopt the following optimization manners.

In the optimization manner 1, according to the handover type identifier in the CHO-related RLF report, it is determined whether the parameter to be optimized corresponding to the execution/triggering condition related to the CHO or corresponding to the measurement reporting condition related to the handover of other handover types.

Even if the terminal actually performs traditional handover, as long as the network has previously configured CHO configurations for the terminal, it means that the handover thresholds corresponding to these CHO resource configurations are set too high.

In the optimization manner 2, access resources of candidate cells, for which it is not necessary to configure CHO, for the first terminal, where the first terminal is a terminal device that has a similar movement trajectory and/or reports a similar measurement report as the terminal device that sends the CHO-related RLF report.

Optionally, the optimization manner of reducing the access resources of candidate cells, for which CHO is unnecessary to be configured, for the first terminal is performed according to at least one of the following contents in the CHO-related RLF report:

- the result of signal measurements on candidate cells that do not meet the handover execution/triggering condition, which is obtained until CHO is performed, or until conventional handover is performed, or until RLF is detected, or until HOF is detected, or until result of signal measurement on at least one candidate cell meets the handover execution/triggering condition; and/or the result of signal measurements on candidate cells that meet the handover execution/triggering condition; and/or the result of signal measurements on candidate cells that do not meet the handover execution/triggering condition.

In the optimization manner 3, conditional RRC reconfiguration resources corresponding to candidate cells, where additional configuration of CHO is necessary, are added for the first terminal, where the first terminal is a terminal device that has a similar movement trajectory and/or reports a similar measurement report as the terminal device that sends the CHO-related RLF report.

Optionally, the resources of candidate cells, where additional configuration of CHO is necessary, are added in the CHO configuration according to the result of signal measurement performed by the terminal device on the neighbor cell until the CHO is performed, or the result of signal measurement performed by the terminal device on the neighbor cell until the conventional handover is performed, or the result of signal measurement performed by the terminal device on the neighbor cell until the RLF is detected, or the result of signal measurement performed by the terminal device on the neighbor cell until the HOF is detected, or the result of signal measurement performed by the terminal device on the neighbor cell until the result of signal measurement on at least one candidate cell meets the handover execution/triggering condition. For example, if the measurement result of a certain cell is very high, but this cell is not in the previously configured range of candidate cells, this neighbor cell is added as the candidate cell of CHO for the terminal.

In the optimization manner 4, if the terminal device has experienced RLF in the first cell (e.g., the source cell) until the CHO is executed, and the time length from receiving the CHO configuration to triggering the CHO is too long, the source base station adjusts the CHO execution/triggering condition of the target cell for the first terminal, where the first terminal is a terminal device that has a similar movement trajectory and/or reports a similar measurement report as the terminal device that sends the CHO-related RLF report.

For example, the CHO execution/triggering condition of the target cell is adjusted to be easier to be met. Optionally, the adjustment amplitude may be determined according to the result of signal measurement performed by the terminal device on the first cell (e.g., the source cell) when the RLF occurs. Optionally, if the signal quality of the first cell (e.g., the source cell) is very poor, the adjustment amplitude of condition is larger, for example, the trigger time (time-to-trigger) is adjusted to be shorter, or the signal threshold difference between the target cell and the source cell is reduced.

As seen from the above embodiments, the terminal device sends the CHO-related RLF report. Based on the content in the CHO-related RLF report, the network device can optimize the CHO configuration for the terminal device that needs to perform the CHO in the future.

Some embodiments of this application further propose a method for receiving and using radio link failure report. FIG. 6 is an implementation flowchart of a method 600 for receiving and using an RLF report according to some embodiments of this application. The method is optionally applied to the system shown in FIG. 1, such as being applied to the source base station in the system shown in FIG. 1, but is not limited thereto. The method includes at least some of the following.

In S610, a CHO-related RLF report of the terminal device is received, where the CHO-related RLF report includes at least one of the following:

- a result of signal measurement performed by the terminal device on a neighbor cell;
- a result of signal measurement performed by the terminal device on a candidate cell not meeting a handover execution/triggering condition;
- a list of candidate cells meeting the handover execution/triggering condition;
- a list of candidate cells not meeting the handover execution/triggering condition;
- an identifier of a first cell, where the first cell includes a cell where the terminal device receives an RRC reconfiguration signaling;
- indication information of a handover execution condition type configured for the terminal device;
- a parameter corresponding to a configured handover execution condition;
- information used for indicating whether the terminal device has experienced RLF in the first cell until the CHO is performed;
- a length of time from receiving a CHO configuration to triggering the CHO;
- a handover type identifier.

Optionally, the method further includes: optimizing a CHO configuration according to the CHO-related RLF report.

Optionally, the result of signal measurement performed by the terminal device on the neighbor cell includes at least one of following:

- the result of signal measurement performed by the terminal device on the neighbor cell until the CHO is performed;
- the result of signal measurement performed by the terminal device on the neighbor cell until a traditional handover is performed;
- the result of signal measurement performed by the terminal device on the neighbor cell until an RLF is detected;
- the result of signal measurement performed by the terminal device on the neighbor cell until a handover failure (HOF) is detected;
- the result of signal measurement performed by the terminal device on the neighbor cell until a result of signal measurement on at least one candidate cell meets the handover execution/triggering condition;

Optionally, the result of signal measurement performed by the terminal device on the candidate cell not meeting the handover execution/triggering condition includes at least one of following:

- the result of signal measurement performed by the terminal device on the candidate cell not meeting the handover execution/triggering condition until the CHO is performed;
- the result of signal measurement performed by the terminal device on the candidate cell not meeting the handover execution/triggering condition until the traditional handover is performed;
- the result of signal measurement performed by the terminal device on the candidate cell not meeting the handover execution/triggering condition until the RLF is detected;
- the result of signal measurement performed by the terminal device on the candidate cell not meeting the handover execution/triggering condition until the HOF is detected;
- the result of signal measurement performed by the terminal device on the candidate cell not meeting the handover execution/triggering condition until the result of signal measurement on the at least one candidate cell meets the handover execution/triggering condition.

Optionally, the result of signal measurement includes at least one of following:

- reference signal receiving power (RSRP);
- reference signal receiving quality (RSRQ);
- signal to interference plus noise ratio (SINR).

Optionally, the parameter includes at least one of a frequency-specific offset, a cell-specific offset, an additional offset, a hysteresis, or a threshold.

Optionally, the neighbor cell includes a candidate cell and/or a non-candidate cell.

Optionally, the handover type identifier is used for indicating a handover type is a CHO or an unconditional handover.

Optionally, the result of signal measurement performed by the terminal device on the neighbor cell includes a measurement result on at least one neighbor cell, and the measurement result on the neighbor cell includes at least one of following:

a result of signal measurement on the neighbor cell;

a cell ID of the neighbor cell;

indication information of whether the neighbor cell is a candidate cell.

Optionally, the result of signal measurement performed by the terminal device on the neighbor cell includes the result of signal measurement on at least one neighbor cell corresponding to a frequency where at least one synchronization signal block (SSB) or channel status indicator reference signal (CSI-RS) is located.

Optionally, a list where the result of signal measurement on the neighbor cell is located or the result of signal measurement of respective neighbor cell further includes information used for indicating whether the respective neighbor cell is a candidate cell.

Optionally, the result of signal measurement performed by the terminal device on the neighbor cell includes: a first neighbor cell measurement result list and a second neighbor cell measurement result list; where, the first neighbor cell measurement result list includes a result of signal measurement on a neighbor cell belonging to the candidate cell;

the second neighbor cell measurement result list includes a result of signal measurement on a neighbor cell not belonging to the candidate cell.

Optionally, when indicating the RLF has been experienced, the CHO-related RLF report further includes: a result of signal measurement performed by the terminal device on a candidate cell and/or a result of signal measurement on a neighbor cell when the RLF occurs in the first cell.

Optionally, optimizing the CHO configuration includes:

optimizing, according to the result of signal measurement performed by the terminal device on the candidate cell and/or the result of signal measurement on the neighbor cell when the RLF occurs in the first cell, a relevant parameter of a CHO execution/triggering condition.

Optionally, in response to a handover failure, optimizing the relevant parameter of the CHO execution/triggering condition includes at least one of following:

increasing a hysteresis and/or an offset corresponding to an A3 event related to CHO execution/triggering oriented to a target cell in the CHO configuration to be configured for a terminal, which has a similar movement trajectory and/or a similar signal measurement result;

increasing a signal threshold of the target cell corresponding to an A5 event;

decreasing a signal threshold of the first cell corresponding to the A5 event.

Optionally, in response to the RLF occurs in the first cell, optimizing the relevant parameter of the CHO execution/triggering condition includes at least one of following:

decreasing a hysteresis and/or an offset corresponding to a CHO execution/triggering A3 event oriented to a target cell in the CHO configuration to be configured for a terminal, which has a similar movement trajectory and/or a similar signal measurement result;

decreasing a signal threshold of the target cell corresponding to an A5 event;

increasing a signal threshold of the first cell corresponding to the A5 event.

Optionally, in response to a HO failure, optimizing the CHO configuration includes at least one of following:

adding a cell experiencing successful RRC reestablishment/connection establishment to a candidate cell selection range;

increasing a hysteresis and/or an offset corresponding to a CHO execution/triggering A3 event oriented to the cell experiencing successful RRC reestablishment/connection establishment in the CHO configuration to be configured for a terminal, which has a similar movement trajectory and/or a similar signal measurement result;

increasing a signal threshold of a target cell corresponding to an A5 event;

decreasing a signal threshold of the first cell corresponding to the A5 event.

Optionally, the method further includes: determining, according to the handover type identifier, whether a parameter corresponding to an execution/triggering condition related to CHO conditional handover or a parameter related to a measurement report condition corresponding to a handover of another handover type is to be optimized.

Optionally, optimizing the CHO configuration includes:

reducing, for a first terminal, access resources of candidate cells where configuration of CHO is unnecessary, the first terminal being a terminal device that has a similar movement trajectory and/or reports a similar measurement report as the terminal device.

Optionally, conditional RRC reconfiguration resources, of the candidate cells where CHO is unnecessary, are reduced according to at least one of following:

a result of signal measurement performed by the terminal device on the candidate cell not meeting the handover execution/triggering condition;

the list of candidate cells meeting the handover execution/triggering condition;

the list of candidate cells not meeting the handover execution/triggering condition.

Optionally, optimizing the CHO configuration includes:

adding, for a first terminal, conditional RRC reconfiguration resources of candidate cells where additional configuration of CHO is necessary, the first terminal being a terminal device that has a similar movement trajectory and/or reports a similar measurement report as the terminal device.

Optionally, resources, of the candidate cells where additional configuration of CHO is necessary, are added to the CHO configuration according to the result of signal measurement performed by the terminal device on the neighbor cell.

Optionally, optimizing the CHO configuration includes:

in response to the terminal device has experienced RLF in the first cell until the CHO is performed, and the length of time from receiving the CHO configuration to triggering the CHO is equal to or exceeds a time length threshold, adjusting a CHO execution/triggering condition of a target cell for the first terminal, where the first terminal has a similar movement trajectory and/or reports a similar measurement report as the terminal device.

Optionally, adjusting the CHO execution/triggering condition of the target cell includes: adjusting the CHO execution/triggering condition of the target cell to be easier to be met.

Optionally, a magnitude of the adjusting is determined according to a result of signal measurement the terminal device on the first cell when the RLF occurs.

Optionally, the network device receives the CHO-related RLF report via an air interface.

Optionally, the network device receives the CHO-related RLF report via an Xn interface.

Optionally, the CHO-related RLF report further includes indication information of that the terminal device has received CHO configuration information.

Optionally, the network device receives a handover report via an Xn interface, and the handover report includes the CHO-related RLF report and/or handover failure indication information.

Figure 7:
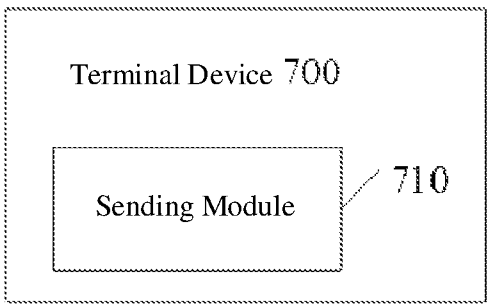
FIG. 7 is a block diagram of a terminal device 700 according to some embodiments of this application.

Some embodiments of this application further propose a terminal device. FIG. 7 is a block diagram of a terminal device 700 according to some embodiments of this application, including following contents.

A sending module 710 is configured to send a CHO-related RLF report, where the CHO-related RLF report includes at least one of the following:

- a result of signal measurement performed by the terminal device on a neighbor cell;
- a result of signal measurement performed by the terminal device on a candidate cell not meeting a handover execution/triggering condition;
- a list of candidate cells meeting the handover execution/triggering condition;
- a list of candidate cells not meeting the handover execution/triggering condition;
- an identifier of a first cell, where the first cell includes a cell where the terminal device receives a radio resource control (RRC) reconfiguration signaling;
- indication information of a handover execution condition type configured for the terminal device;
- a parameter corresponding to a configured handover execution condition;
- information used for indicating whether the terminal device has experienced RLF in the first cell until the CHO is performed;
- a length of time from receiving a CHO configuration to triggering the CHO;
- a handover type identifier.

Optionally, the result of signal measurement performed by the terminal device on the neighbor cell includes at least one of following:

- the result of signal measurement performed by the terminal device on the neighbor cell until the CHO is performed;
- the result of signal measurement performed by the terminal device on the neighbor cell until a traditional handover is performed;
- the result of signal measurement performed by the terminal device on the neighbor cell until an RLF is detected;
- the result of signal measurement performed by the terminal device on the neighbor cell until a handover failure (HOF) is detected;
- the result of signal measurement performed by the terminal device on the neighbor cell until a result of signal measurement on at least one candidate cell meets the handover execution/triggering condition.

Optionally, the result of signal measurement performed by the terminal device on the candidate cell not meeting the handover execution/triggering condition includes at least one of following:

- the result of signal measurement performed by the terminal device on the candidate cell not meeting the handover execution/triggering condition until the CHO is performed;
- the result of signal measurement performed by the terminal device on the candidate cell not meeting the handover execution/triggering condition until the traditional handover is performed;
- the result of signal measurement performed by the terminal device on the candidate cell not meeting the handover execution/triggering condition until the RLF is detected;
- the result of signal measurement performed by the terminal device on the candidate cell not meeting the handover execution/triggering condition until the HOF is detected;
- the result of signal measurement performed by the terminal device on the candidate cell not meeting the handover execution/triggering condition until the result of signal measurement on the at least one candidate cell meets the handover execution/triggering condition.

Optionally, the result of signal measurement includes at least one of following:

- reference signal receiving power (RSRP);
- reference signal receiving quality (RSRQ);
- signal to interference plus noise ratio (SINR).

Optionally, the parameter includes at least one of a frequency-specific offset, a cell-specific offset, an additional offset, a hysteresis, or a threshold.

Optionally, the neighbor cell includes a candidate cell and/or a non-candidate cell.

Optionally, the handover type identifier is used for indicating a handover type is a CHO or an unconditional handover.

Optionally, the result of signal measurement performed by the terminal device on the neighbor cell includes a measurement result on at least one neighbor cell, and the measurement result on the neighbor cell includes at least one of following:

- a result of signal measurement on the neighbor cell;
- a cell ID of the neighbor cell;
- indication information of whether the neighbor cell is a candidate cell.

Optionally, the result of signal measurement performed by the terminal device on the neighbor cell includes the result of signal measurement on at least one neighbor cell corresponding to a frequency where at least one synchronization signal block (SSB) or channel status indicator reference signal (CSI-RS) is located.

Optionally, a list where the result of signal measurement on the neighbor cell is located or the result of signal measurement of respective neighbor cell further includes information used for indicating whether the respective neighbor cell is a candidate cell.

Optionally, the result of signal measurement performed by the terminal device on the neighbor cell includes: a first neighbor cell measurement result list and a second neighbor cell measurement result list; where,

- the first neighbor cell measurement result list includes a result of signal measurement on a neighbor cell belonging to the candidate cell;

the second neighbor cell measurement result list includes a result of signal measurement on a neighbor cell not belonging to the candidate cell.

Optionally, when indicating the RLF has been experienced, the CHO-related RLF report further includes: a result of signal measurement performed by the terminal device on a candidate cell and/or a result of signal measurement on a neighbor cell when the RLF is detected in the first cell.

Optionally, in response to successful RRC reestablishment/connection establishment, the sending module 710 sends the CHO-related RLF report to a cell where the RRC reestablishment/connection establishment is successful.

Optionally, the CHO-related RLF report further includes indication information of that the terminal device has received CHO configuration information.

Optionally, the sending module 710 sends the CHO-related RLF report via an air interface.

It should be understood that the above and other operations and/or functions of the modules in the terminal device according to some embodiments of this application are respectively to implement the corresponding process of the terminal device in the method 200 of FIG. 2, and are not repeated here for brevity.

Figure 8:
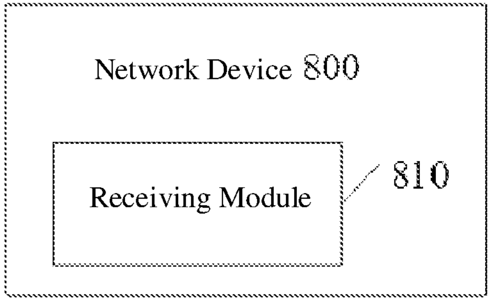
FIG. 8 is a block diagram of a network device 800 according to some embodiments of this application.

Some embodiments of this application further propose a network device. FIG. 8 is a block diagram of a network device 800 according to some embodiments of this application, including following contents.

A receiving module 810 is used for receiving a CHO-related RLF report of the terminal device, and the CHO-related RLF report includes at least one of the following:

- a result of signal measurement performed by the terminal device on a neighbor cell;
- a result of signal measurement performed by the terminal device on a candidate cell not meeting a handover execution/triggering condition;
- a list of candidate cells meeting the handover execution/triggering condition;
- a list of candidate cells not meeting the handover execution/triggering condition;
- an identifier of a first cell, where the first cell includes a cell where the terminal device receives a radio resource control (RRC) reconfiguration signaling;
- indication information of a handover execution condition type configured for the terminal device;
- a parameter corresponding to a configured handover execution condition;
- information used for indicating whether the terminal device has experienced RLF in the first cell until the CHO is performed;
- a length of time from receiving a CHO configuration to triggering the CHO;
- a handover type identifier.

Figure 9:
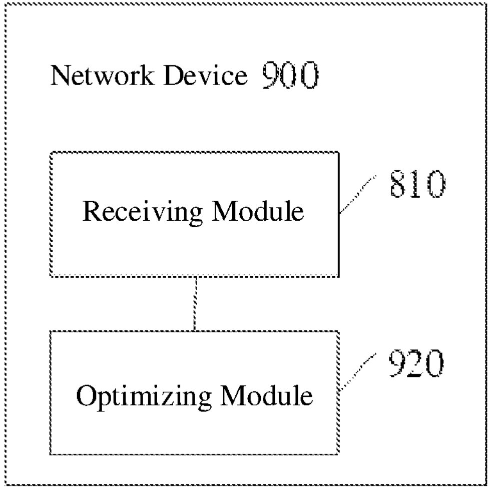
FIG. 9 is a block diagram of a network device 900 according to some embodiments of this application.

FIG. 9 is a block diagram of a network device 900 according to some embodiments of this application. As shown in FIG. 9, the above-mentioned network device may further include an optimization module 920 configured to optimize a CHO configuration according to the CHO-related RLF report.

Optionally, the result of signal measurement performed by the terminal device on the neighbor cell includes at least one of the following:

- the result of signal measurement performed by the terminal device on the neighbor cell until the CHO is performed;
- the result of signal measurement performed by the terminal device on the neighbor cell until a traditional handover is performed;
- the result of signal measurement performed by the terminal device on the neighbor cell until an RLF is detected;
- the result of signal measurement performed by the terminal device on the neighbor cell until a handover failure (HOF) is detected;
- the result of signal measurement performed by the terminal device on the neighbor cell until a result of signal measurement on at least one candidate cell meets the handover execution/triggering condition.

Optionally, the result of signal measurement performed by the terminal device on the candidate cell not meeting the handover execution/triggering condition includes at least one of following:

- the result of signal measurement performed by the terminal device on the candidate cell not meeting the handover execution/triggering condition until the CHO is performed;
- the result of signal measurement performed by the terminal device on the candidate cell not meeting the handover execution/triggering condition until the traditional handover is performed;
- the result of signal measurement performed by the terminal device on the candidate cell not meeting the handover execution/triggering condition until the RLF is detected;
- the result of signal measurement performed by the terminal device on the candidate cell not meeting the handover execution/triggering condition until the HOF is detected;
- the result of signal measurement performed by the terminal device on the candidate cell not meeting the handover execution/triggering condition until the result of signal measurement on the at least one candidate cell meets the handover execution/triggering condition.

Optionally, the result of signal measurement includes at least one of following:

- reference signal receiving power (RSRP);
- reference signal receiving quality (RSRQ);
- signal to interference plus noise ratio (SINR).

Optionally, the parameter includes at least one of a frequency-specific offset, a cell-specific offset, an additional offset, a hysteresis, or a threshold.

Optionally, the neighbor cell includes a candidate cell and/or a non-candidate cell.

Optionally, the handover type identifier is used for indicating a handover type is a CHO or an unconditional handover.

Optionally, the result of signal measurement performed by the terminal device on the neighbor cell includes a measurement result on each neighbor cell, and the measurement result on each neighbor cell includes at least one of following:

- a result of signal measurement on the neighbor cell;
- a cell ID of the neighbor cell;
- indication information of whether the neighbor cell is a candidate cell.

Optionally, the result of signal measurement performed by the terminal device on the neighbor cell includes the result of signal measurement on at least one neighbor cell corresponding to a frequency where at least one synchronization signal block (SSB) or channel status indicator reference signal (CSI-RS) is located.

Optionally, a list where the result of signal measurement on the neighbor cell is located or the result of signal measurement of respective neighbor cell further includes information used for indicating whether the respective neighbor cell is a candidate cell.

Optionally, the result of signal measurement performed by the terminal device on the neighbor cell includes: a first neighbor cell measurement result list and a second neighbor cell measurement result list; where,

- the first neighbor cell measurement result list includes a result of signal measurement on a neighbor cell belonging to the candidate cell;
- the second neighbor cell measurement result list includes a result of signal measurement on a neighbor cell not belonging to the candidate cell.

Optionally, when indicating the RLF has been experienced, the CHO-related RLF report further includes: a result of signal measurement performed by the terminal device on a candidate cell and/or a result of signal measurement on a neighbor cell when the RLF occurs in the first cell.

Optionally, the optimizing module 920 is configured to:

- optimize, according to the result of signal measurement performed by the terminal device on the candidate cell and/or the result of signal measurement on the neighbor cell when the RLF occurs in the first cell, a relevant parameter of a CHO execution/triggering condition.

Optionally, in response to a HOF during handover, optimizing the relevant parameter of the CHO execution/triggering condition includes at least one of following:

- increasing a hysteresis and/or an offset corresponding to an A3 event related to CHO execution/triggering oriented to a target cell in the CHO configuration to be configured for a terminal, which has a similar movement trajectory and/or has a similar signal measurement result;
- increasing a signal threshold of the target cell corresponding to an A5 event;
- decreasing a signal threshold of the first cell corresponding to the A5 event.

Optionally, in response to the RLF occurs in the first cell, optimizing the relevant parameter of the CHO execution/triggering condition includes at least one of following:

- decreasing a hysteresis and/or an offset corresponding to a CHO execution/triggering A3 event oriented to a target cell in the CHO configuration to be configured for a terminal, which has a similar movement trajectory and/or has a similar signal measurement result;
- decreasing a signal threshold of the target cell corresponding to an A5 event;
- increasing a signal threshold of the first cell corresponding to the A5 event.

Optionally, in response to a handover failure, optimizing the CHO configuration includes at least one of following:

- adding a cell experiencing successful RRC reestablishment/connection establishment to a candidate cell selection range;
- increasing a hysteresis and/or an offset corresponding to a CHO execution/triggering A3 event oriented to the cell experiencing successful RRC reestablishment/connection establishment in the CHO configuration to be configured for a terminal, which has a similar movement trajectory and/or has a similar signal measurement result;
- increasing a signal threshold of a target cell corresponding to an A5 event;
- decreasing a signal threshold of the first cell corresponding to the A5 event.

Optionally, the optimizing module 920 is further configured to: determine, according to the handover type identifier, whether a parameter corresponding to an execution/triggering condition related to CHO conditional handover or a parameter related to a measurement report condition corresponding to a handover of another handover type is to be optimized.

Optionally, the optimizing module 920 is configured to: reduce, for a first terminal, access resources of candidate cells where configuration of CHO is unnecessary, where the first terminal is a terminal device having a similar movement trajectory and/or reporting a similar measurement report as the terminal device.

Optionally, conditional RRC reconfiguration resources, of the candidate cells where CHO is unnecessary, are reduced according to at least one of following:

- a result of signal measurement performed by the terminal device on the candidate cell not meeting the handover execution/triggering condition;
- the list of candidate cells meeting the handover execution/triggering condition;
- the list of candidate cells not meeting the handover execution/triggering condition.

Optionally, the optimizing module 920 is configured to: add, for a first terminal, conditional RRC reconfiguration resources of candidate cells where additional configuration of CHO is necessary, where the first terminal has a similar movement trajectory and/or reports a similar measurement report as the terminal device.

Optionally, resources, of the candidate cells where additional configuration of CHO is necessary, are added to the CHO configuration according to the result of signal measurement performed by the terminal device on the neighbor cell.

Optionally, the optimizing module 920 is further configured to:

- in response to the terminal device has experienced RLF in the first cell until the CHO is performed, and the length of time from receiving the CHO configuration to triggering the CHO is equal to or exceeds a time length threshold, adjust a CHO execution/triggering condition of a target cell for the first terminal, where the first terminal has a similar movement trajectory and/or reports a similar measurement report as the terminal device.

Optionally, adjusting the CHO execution/triggering condition of the target cell includes: adjusting the CHO execution/triggering condition of the target cell to be easier to be met.

Optionally, a magnitude of the adjusting is determined according to a result of signal measurement the terminal device on the first cell when the RLF occurs.

Optionally, the receiving module 810 receives the CHO-related RLF report via an air interface.

Optionally, the receiving module 810 receives the CHO-related RLF report via an Xn interface.

Optionally, the CHO-related RLF report further includes indication information of that the terminal device has received CHO configuration information.

Optionally, the receiving module 810 receives a handover report via an Xn interface, and the handover report includes the CHO-related RLF report and/or handover failure indication information.

It should be understood that the above and other operations and/or functions of the modules in the network device according to some embodiments of this application are respectively to implement the corresponding flow of the network device in the method 600 in FIG. 6, and are not repeated here for brevity.

Figure 10:
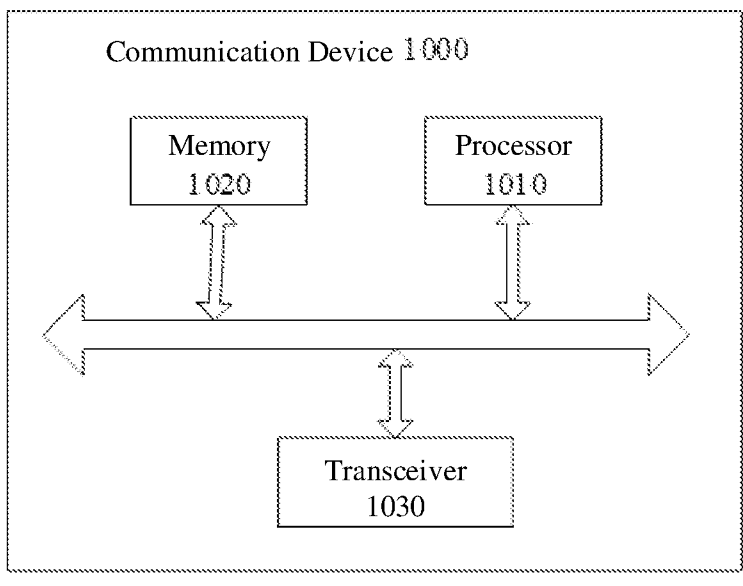
FIG. 10 is a block diagram of a communication device 1000 according to some embodiments of this application.

FIG. 10 is a block diagram of a communication device 1000 according to some embodiments of this application.

The communication device 1000 shown in FIG. 10 includes a processor 1010, and the processor 1010 may call and run a computer program from a memory to implement the method according to some embodiments of this application.

Optionally, as shown in FIG. 10, the communication device 1000 may further include a memory 1020. The processor 1010 may call and run the computer program from the memory 1020 to implement the methods according to some embodiments of this application.

The memory 1020 may be a separate device independent of the processor 1010, or may be integrated in the processor 1010.

Optionally, as shown in FIG. 10, the communication device 1000 may further include a transceiver 1030, and the processor 1010 may control the transceiver 1030 to communicate with other devices, specifically, may send information or data to other devices, or receive information or data sent by other devices.

In some embodiments, the transceiver 1030 may include a transmitter and a receiver. The transceiver 1030 may further include an antenna(s), and the number of the antenna(s) may be one or more.

Optionally, the communication device 1000 may be a terminal device according to some embodiments of this application, and the communication device 1000 may implement the corresponding processes implemented by the terminal device in each method according to some embodiments of this application, which is not repeated here for brevity.

Optionally, the communication device 1000 may be a network device according to some embodiments of this application, and the communication device 1000 may implement the corresponding processes implemented by the network device in each method according to some embodiments of this application, which is not repeated here for brevity.

Figure 11:
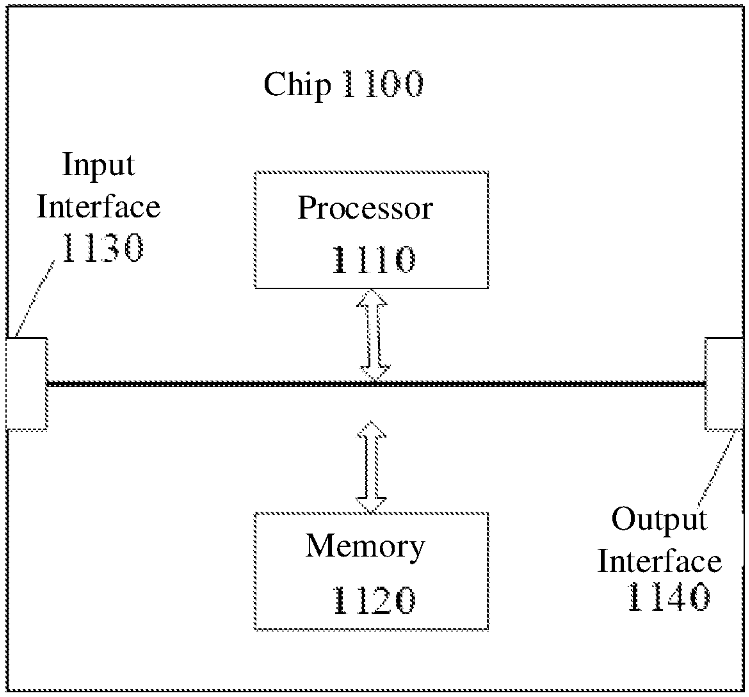
FIG. 11 is a block diagram of a chip 1100 according to some embodiments of this application.

FIG. 11 is a block diagram of a chip 1100 according to some embodiments of this application. The chip 1100 shown in FIG. 11 includes a processor 1110, and the processor 1110 may call and run a computer program from a memory to implement the method according to some embodiments of this application.

Optionally, as shown in FIG. 11, the chip 1100 may further include a memory 1120. The processor 1110 may call and run the computer program from the memory 1120 to implement the methods according to some embodiments of this application.

The memory 1120 may be a separate device independent of the processor 1110, or may be integrated in the processor 1110.

Optionally, the chip 1100 may further include an input interface 1130. The processor 1110 may control the input interface 1130 to communicate with other devices or chips, and specifically, may obtain information or data sent by other devices or chips.

Optionally, the chip 1100 may further include an output interface 1140. The processor 1110 may control the output interface 1140 to communicate with other devices or chips, and specifically, may output information or data to other devices or chips.

Optionally, the chip may be applied to the terminal device according to some embodiments of this application, and the chip may implement the corresponding processes implemented by the terminal device in each method according to some embodiments of this application, which is not repeated here for brevity.

Optionally, the chip may be applied to the network device according to some embodiments of this application, and the chip may implement the corresponding processes implemented by the network device in each method according to some embodiments of this application, which is not repeated here for brevity.

It should be understood that the chip mentioned in some embodiments of this application may also be referred to as a system-level chip, a system chip, a chip system, or a system-on-a-chip, or the like.

The above-mentioned processor may be a general-purpose processor, a digital signal processor (DSP), an field programmable gate array (FPGA), an application specific integrated circuit (ASIC) or other programmable logic devices, transistor logic devices, discrete hardware components, or the like. The general-purpose processor mentioned above may be a microprocessor or any conventional processor or the like.

The memory mentioned above may be either volatile memory or non-volatile memory, or may include both volatile and non-volatile memory. The non-volatile memory may be read-only memory (ROM), programmable ROM (PROM), erasable PROM (EPROM), electrically EPROM (EEPROM) or flash memory. The volatile memory may be random access memory (RAM).

It should be understood that the above memory is an example but not a limitative description, for example, the memory according to some embodiments of this application may also be static RAM (SRAM), dynamic RAM (DRAM), synchronous DRAM (SDRAM), double data rate SDRAM (DDR SDRAM), enhanced SDRAM (ESDRAM), synch link DRAM (SLDRAM), direct Rambus RAM (DR RAM), and the like. In other words, the memory according to some embodiments of this application is intended to include but not limited to these and any other suitable types of memory.

In the above-mentioned embodiments, it may be implemented in whole or in part by software, hardware, firmware or any combination thereof. When implemented in software, it may be implemented in whole or in part in the form of a computer program product. The computer program product includes one or more computer instructions. When the computer program instructions are loaded and executed on a computer, all or part of the processes or functions described in some embodiments of this application are generated. The computer may be a general purpose computer, special purpose computer, computer network, or other programmable device. The computer instructions may be stored on or transmitted from one computer readable storage medium to another. For example, the computer instructions may be transmitted from a website site, computer, server or data center to another website site, computer, server or data center in a wired manner (e.g., coaxial cable, optical fiber, digital subscriber line (DSL)) or a wireless manner (e.g., infrared, radio, microwave, and the like). The computer-readable storage medium may be any available medium that can be accessed by a computer or a data storage device such as a server, data center, etc., that is integrated with one or more available medium. The available medium may be a magnetic medium (e.g., a floppy disk, a hard disk, a magnetic tape), an optical medium (e.g., a DVD), a semiconductor medium (e.g., a solid state disk (SSD)), or the like.

It should be understood that, in various embodiments of this application, the size of the sequence numbers of the above-mentioned processes does not mean the sequence of execution, and the execution sequence of each process should be determined by its functions and internal logic, and should not constitute any limitation on some embodiments of this application.

Those skilled in the art can clearly understand that, for the convenience and brevity of description, the specific working process of the above-described systems, devices and units may refer to the corresponding processes in the foregoing method embodiments, which will not be repeated here.

The above are only specific embodiments of this application, but the protection scope of this application is not limited thereto. Any person skilled in the art who is familiar with the technical scope disclosed in this application can easily think of changes or substitutions, which should be covered within the protection scope of this application. Therefore, the protection scope of this application shall be subject to the protection scope of the claims.

What is claimed is:

1. A method for sending radio link failure (RLF) report, applied to a terminal device, comprising:

sending an RLF report related to a conditional handover (CHO), wherein the RLF report related to the CHO comprises:

a result of signal measurement performed by the terminal device on a neighbor cell;

a parameter corresponding to a configured handover execution condition; and a length of time from receiving a CHO configuration to triggering the CHO.

2. The method as claimed in claim 1, wherein, the result of signal measurement performed by the terminal device on the neighbor cell comprises at least one of following:

the result of signal measurement performed by the terminal device on the neighbor cell until the CHO is performed;

the result of signal measurement performed by the terminal device on the neighbor cell until a traditional handover is performed;

the result of signal measurement performed by the terminal device on the neighbor cell until an RLF is detected;

the result of signal measurement performed by the terminal device on the neighbor cell until a handover failure (HOF) is detected; and the result of signal measurement performed by the terminal device on the neighbor cell until a result of signal measurement on at least one candidate cell meets the handover execution/triggering condition.

3. The method as claimed in claim 2, wherein the neighbor cell comprises a candidate cell and/or a non-candidate cell.

4. The method as claimed in claim 2, wherein the result of signal measurement of the terminal device on the neighbor cell comprises a measurement result on at least one neighbor cell, and the measurement result on the neighbor cell comprises at least one of following:

a result of signal measurement on the neighbor cell;

a cell ID of the neighbor cell; and indication information of whether the neighbor cell is a candidate cell.

5. A terminal device, comprising a processor, a memory and a transceiver, wherein the memory is configured to store a computer program, and the processor is configured to invoke and run the computer program stored in the memory to:

send, via the transceiver, a radio link failure (RLF) report related to a conditional handover (CHO), wherein the RLF report related to the CHO comprises:

a result of signal measurement performed by the terminal device on a neighbor cell;

a parameter corresponding to a configured handover execution condition; and a length of time from receiving a CHO configuration to triggering the CHO.

6. The terminal device as claimed in claim 5, wherein, the result of signal measurement performed by the terminal device on the neighbor cell comprises at least one of following:

the result of signal measurement performed by the terminal device on the neighbor cell until the CHO is performed;

the result of signal measurement performed by the terminal device on the neighbor cell until a traditional handover is performed;

the result of signal measurement performed by the terminal device on the neighbor cell until an RLF is detected;

the result of signal measurement performed by the terminal device on the neighbor cell until a handover failure (HOF) is detected; and the result of signal measurement performed by the terminal device on the neighbor cell until a result of signal measurement on at least one candidate cell meets the handover execution/triggering condition.

7. The terminal device as claimed in claim 6, wherein the neighbor cell comprises a candidate cell and/or a non-candidate cell.

8. The terminal device as claimed in claim 6, wherein the result of signal measurement performed by the terminal device on the neighbor cell comprises a measurement result on at least one neighbor cell, and the measurement result on the neighbor cell comprises at least one of following:

a result of signal measurement on the neighbor cell;

a cell ID of the neighbor cell; and indication information of whether the neighbor cell is a candidate cell.

9. A network device, comprising a processor, a memory and a transceiver, wherein the memory is configured to store a computer program, and the processor is configured to invoke and run the computer program stored in the memory to:

receive, via the transceiver, from a terminal device an RLF report related to a conditional handover (CHO), wherein the RLF report related to the CHO comprises:

a result of signal measurement performed by the terminal device on a neighbor cell;

a parameter corresponding to a configured handover execution condition; and a length of time from receiving a CHO configuration to triggering the CHO.

10. The network device as claimed in claim 9, wherein the processor is further configured to:

optimize a CHO configuration according to the RLF report related to the CHO.

11. The network device as claimed in claim 9, wherein, the result of signal measurement performed by the terminal device on the neighbor cell comprises at least one of following:

the result of signal measurement performed by the terminal device on the neighbor cell until the CHO is performed;

the result of signal measurement performed by the terminal device on the neighbor cell until a traditional handover is performed;

the result of signal measurement performed by the terminal device on the neighbor cell until an RLF is detected;

the result of signal measurement performed by the terminal device on the neighbor cell until a handover failure (HOF) is detected; and the result of signal measurement performed by the terminal device on the neighbor cell until a result of signal measurement on at least one candidate cell meets the handover execution/triggering condition.

12. The network device as claimed in claim 11, wherein the neighbor cell comprises a candidate cell and/or a non-candidate cell.

13. The network device as claimed in claim 11, wherein the result of signal measurement performed by the terminal device on the neighbor cell comprises a measurement result on at least one neighbor cell, and the measurement result on the neighbor cell comprises at least one of following:

a result of signal measurement on the neighbor cell;

a cell ID of the neighbor cell; and indication information of whether the neighbor cell is a candidate cell.

* * * * *